ized States Patent US 9,490,895 B2
Frisken et al. Nov. 8, 2016

(54) ULTRAFAST HIGH RESOLUTION OPTICAL CHANNEL MONITOR

(71) Applicant: Finisar Corporation, Horsham, PA (US)

(72) Inventors: Steven James Frisken, Vaucluse (AU); Cibby Pulikkaseril, Waterloo (AU); Simon Poole, Waterloo (AU)

(73) Assignee: Finisar Corporation, Horsham, PA (US)

( * ) Notice: Subject to any disclaimer, the term of this patent is extended or adjusted under 35 U.S.C. 154(b) by 0 days.

(21) Appl. No.: 14/483,847

(22) Filed: Sep. 11, 2014

(65) Prior Publication Data

US 2015/0086198 A1   Mar. 26, 2015

Related U.S. Application Data

(60) Provisional application No. 61/880,300, filed on Sep. 20, 2013.

(51) Int. Cl.
    *H04B 10/079* (2013.01)
(52) U.S. Cl.
    CPC .................. *H04B 10/0795* (2013.01)
(58) Field of Classification Search
    CPC ................................. H04B 10/0795
    See application file for complete search history.

(56) References Cited

U.S. PATENT DOCUMENTS

| 5,473,463 A | 12/1995 | Van Deventer |
| 6,327,019 B1 | 12/2001 | Patel et al. |
| 6,917,031 B1 | 7/2005 | Sun et al. |
| 7,209,670 B2 | 4/2007 | Fludger et al. |
| 7,315,575 B2 | 1/2008 | Sun et al. |
| 8,526,830 B2 | 9/2013 | Frisken |

(Continued)

FOREIGN PATENT DOCUMENTS

| WO | 03/032071 A1 | 4/2003 |
| WO | 2004/005993 A1 | 1/2004 |

OTHER PUBLICATIONS

Johansson, L.A., et al., Sampled-Grating DBR Laser-Based Analog Optical Transmitters, Dec. 2003, 9 pages, vol. 21, No. 12, Journal of Lightwave Technology, IEEE.

(Continued)

*Primary Examiner* — David Payne
*Assistant Examiner* — Omar S Ismail
(74) *Attorney, Agent, or Firm* — Kurt Rauschenbach; Rauschenbach Patent Law Group, LLC

(57) ABSTRACT

Described herein is an optical channel monitor (1) including a protective housing (3), an input port (5) disposed in the housing (3) and configured for receiving at least one input optical signal (7) including one or more optical channels separated by wavelength. A wavelength configurable laser (9) is located within the housing (3) and is configured to provide an optical reference signal (11) at a first wavelength ($\lambda_r$). The laser (9) is adapted to scan across a range of wavelengths covering the one or more optical channels. An optical mixing module (13) is coupled to the input port (5) and the laser (9) for mixing the input optical signal (7) with the optical reference signal (11) to produce a mixed output signal. A receiver module (15) is configured to receive the mixed output signal and extract signal information indicative of at least the optical power of the at least one input optical signal at the first wavelength ($\lambda_r$).

20 Claims, 8 Drawing Sheets

(56) References Cited

U.S. PATENT DOCUMENTS

| | | |
|---|---|---|
| 9,236,940 B2 | 1/2016 | Frisken |
| 2002/0131691 A1 | 9/2002 | Garrett et al. |
| 2004/0008989 A1* | 1/2004 | Hung ............... H04J 14/02 398/69 |
| 2005/0094925 A1* | 5/2005 | Kish ................ B82Y 20/00 385/14 |
| 2005/0259907 A1* | 11/2005 | Tan ................. H04B 10/61 385/11 |
| 2007/0002922 A1* | 1/2007 | McDonald ........... G02B 5/126 372/92 |
| 2007/0223932 A1 | 9/2007 | Hsieh |
| 2010/0014802 A1* | 1/2010 | Chapman ............ G02B 6/125 385/11 |
| 2010/0247096 A1* | 9/2010 | Emery .............. H04J 14/0227 398/30 |
| 2012/0224184 A1* | 9/2012 | Li ................. H04B 10/60 356/491 |
| 2012/0281982 A1 | 11/2012 | Frisken et al. |
| 2014/0376909 A1* | 12/2014 | Frisken ............ H04J 14/0227 398/26 |
| 2015/0049984 A1* | 2/2015 | Kato ............... G02F 1/225 385/31 |

OTHER PUBLICATIONS

T-BERD/MTS-6000A and -8000 Platforms, Dec. 2013, 2 pages, Website: www.jdsu.com/nse, JDSU Uniphase Corporation.

"Supplementary Search Report" for EP 05749258.9-2271/1766819, Jan. 30, 2013, European Patent Office, Munich, Germany.

Li, Guifang, Recent Advances in Coherent Optical Communication, Advances in Optics and Photonics I, 2009, pp. 279-307.

"Office Action" for U.S. Appl. No. 12/842,333, Oct. 30, 2012, 16 pages, USPTO.

"Office Action" for U.S. Appl. No. 12/842,333, Apr. 8, 2013, 10 pages, USPTO.

"Office Action" for U.S. Appl. No. 13/955,351, Nov. 12, 2014, 21 pages, USPTO.

"Office Action" for U.S. Appl. No. 13/955,351, May 14, 2014, 10 pages, USPTO.

\* cited by examiner

ULTRAFAST HIGH RESOLUTION OPTICAL CHANNEL MONITOR

CROSS-REFERENCE TO RELATED APPLICATION

This application is a non-provisional application of U.S. Provisional Patent Application Ser. No. 61/880,300 filed Sep. 20, 2013, entitled "Coherent Optical Channel Monitor." The entire disclosure of U.S. Provisional Patent Application Ser. No. 61/880,300 is incorporated herein by reference.

FIELD OF THE INVENTION

The present invention relates to monitoring optical signals in optical systems and in particular to a high resolution optical channel monitor. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Performance monitoring of optical channels is an important step in the assessment and management of a stable optical system. Performance monitoring is often performed at various locations throughout an optical system using performance monitors such as optical channel monitors (OCMs). Parameters that can affect the system performance include the signal power, signal wavelength, optical signal-to-noise ratio (OSNR), polarization-mode-dispersion (PMD) and polarization-dependent-loss (PDL). Various OCMs are configured to monitor one or more of these parameters.

Producing a high resolution OCM is typically always challenging. Etalon techniques often suffer due to the required filter shape and deconvolution issues whilst Gaussian band shapes (e.g. from a grating spectrometer within the OCM) require a large beam to access a very high number of grating lines and so are challenged in terms of size and cost. Some techniques rely on the parallel acquisition of different channels or require serial scanning of multiple ports with additional fiber coupled switch requirement.

SUMMARY OF THE INVENTION

It is an object of the invention, in its preferred form to provide an improved or alternative compact high resolution optical channel monitor.

In accordance with a first aspect of the present invention there is provided an optical channel monitor including:
 a protective housing;
 an input port disposed in the housing and configured for receiving at least one input optical signal including one or more optical channels separated by wavelength;
 a wavelength configurable laser located within the housing and configured to provide an optical reference signal at a first wavelength, the laser being adapted to scan across a range of wavelengths covering the one or more optical channels;
 an optical mixing module coupled to the input port and the laser for mixing the at least one input optical signal with the optical reference signal to produce a mixed output signal; and
 a receiver module configured to receive the mixed output signal and extract signal information indicative of at least the optical power of the at least one input optical signal at the first wavelength.

The optical reference signal is preferably coupled from the laser to the mixing module through free-space and one or more lenses.

The extracted signal information is preferably also indicative of the polarization of the at least one input optical signal at the first wavelength.

The optical channel monitor preferably also includes a signal selecting module for selecting an input optical signal from a plurality of optical signals. The signal selecting module preferably includes a micro-electromechanical mirror (MEMS) tiltable at a number of predefined angles, wherein the tilt angle sets the particular optical signal to be passed to the optical mixing module. The signal selecting module preferably also includes a lens for angularly focusing the plurality of beams onto the MEMS.

The input optical signal and reference signal are preferably input substantially perpendicularly to the direction of output of the mixed output signal.

The wavelength configurable laser is preferably a tunable semiconductor laser.

The receiver module preferably includes an array of photo diodes.

The optical mixing module is preferably configured to mix a first signal polarization component with a second orthogonal reference polarization component and to mix a second signal polarization component with a first orthogonal reference polarization component. The optical mixing module preferably includes a first polarization beam splitter for spatially separating the input signal into the first and second orthogonal signal polarization components. The optical mixing module preferably includes a second polarization beam splitter for spatially separating the reference signal into the first and second orthogonal reference polarization components. In some embodiments, the first and second polarization beam splitters are preferably a single unitary element.

The optical mixing module preferably includes a first polarization manipulation element for rotating both the first signal polarization component and the first reference polarization component by 90 degrees. The first polarization manipulation element preferably includes a quarter-wave plate and a mirror.

The optical mixing module preferably includes a second polarization manipulation element for manipulating each of the first and second signal polarization components and the first and second reference polarization components into a circular polarization. The optical mixing module preferably includes a polarization separating element for spatially separating each of the first and second signal polarization components into signal sub-components having orthogonal polarizations and spatially separating the first and second reference polarization components into reference sub-components having orthogonal polarizations.

In accordance with a second aspect of the present invention there is provided a optical channel monitor including:
 a first local oscillator source input;
 an optical channel signal including at least one optical channel;
 first and second beam splitters, each of the beam splitters splitting an input optical signal into substantially orthogonal first and second polarization components, and outputting the first and second polarization components at predetermined positions; and a series of polarization transformation elements arranged around the beam splitters for transforming the polarization of the first and second polarization components to predetermined transformed first and second polarization components;

wherein, a first polarization component of the first local oscillator source input is mixed with an orthogonal second polarization component of the optical channel signal to form a first mixer output; and a second orthogonal polarization component of the first local oscillator source is mixed with the first orthogonal polarization component of the optical channel signal to form a second mixer output.

The optical channel monitor according to the second aspect preferably includes:

a polarization separation element, separating said first mixer output into orthogonal polarization components and said second mixer output into orthogonal polarization components for analysis.

In accordance with a third aspect of the present invention there is provided a control system for an optical network having a plurality of interconnected nodes and at least one compensating module disposed between the nodes, the optical network adapted to transmit optical signals including one or more wavelength channels between the nodes, the control system including:

an optical channel monitor configured to monitor one or more characteristics of the optical channels and send a monitor signal to a system controller; and a system controller in communication with both the optical channel monitor and the at least one compensating module, the controller adapted to, in response to the monitor signal, send a control signal to the at least one compensating module so as to apply compensation to the monitored optical channels.

BRIEF DESCRIPTION OF THE DRAWINGS

Preferred embodiments of the disclosure will now be described, by way of example only, with reference to the accompanying drawings in which.

DETAILED DESCRIPTION

Figure 1:
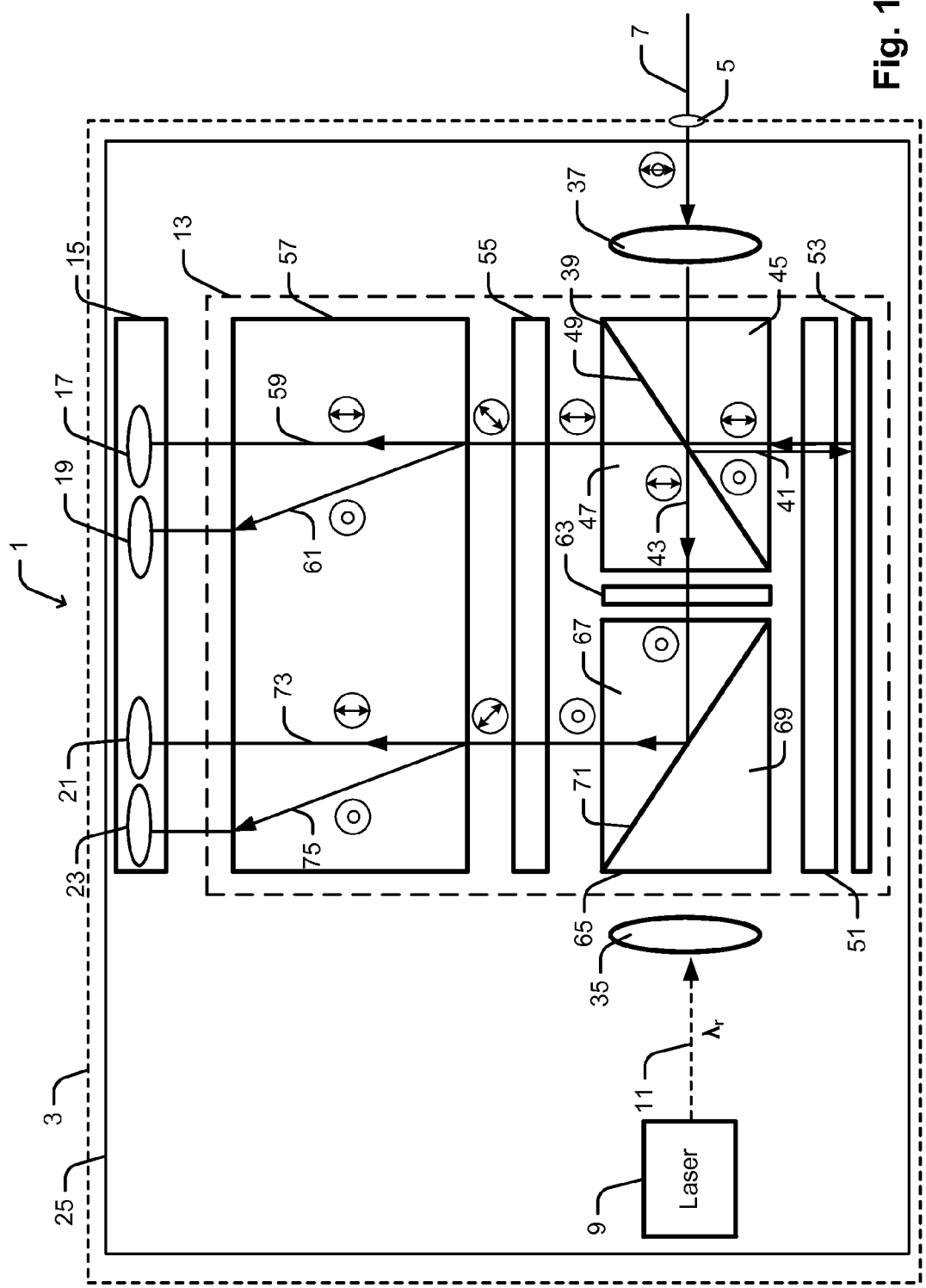
FIG. 1 is a schematic plan view of an optical channel monitor according to a first embodiment illustrating exemplary beam trajectories from an input signal.

Described herein are various embodiments of an ultrafast high resolution optical channel monitor (OCM). The OCM is adapted to be connected, by an optical tap or coupler, to a specified point in an optical network for measuring the power, frequency and other characteristics of optical channels at that point. The OCM is particularly adapted to monitor signals in a wavelength division multiplexed (WDM) system wherein a plurality of optical channels having different wavelengths are multiplexed into (and demultiplexed from) a common carrier signal for transmission across the network. By way of example, in a dense wavelength division multiplexed system (DWDM), optical channels are spaced apart in wavelength by a frequency of 50 GHz. In other exemplary WDM optical systems, optical channels are spaced apart by other frequencies and this spacing may be reconfigurable over time.

Referring initially to FIGS. 1 to 4, there is illustrated an optical channel monitor (OCM) 1 according to a first embodiment. OCM 1 includes an outer protective housing 3 for hermetically sealing the components therein. An input port 5 is disposed in housing 3 and is configured for receiving an input optical signal 7 including one or more optical channels separated by wavelength. A wavelength configurable laser 9 is located within housing 3 and is configured to provide an optical reference signal 11 at a reference wavelength $\lambda_r$. By way of example, in one embodiment, laser 9 is a Finisar F7500 tunable semiconductor type laser adapted to scan step-wise across the entire optical C-band of wavelengths in increments of 1 GHz. More generally, laser 9 is adapted to scan continuously or semi continuously across a predefined wavelength band covering the wavelength channels. In some embodiments, laser 9 other types of lasers are utilized. In some embodiments, laser 9 includes a wavelength referencing element which provides for absolute frequency registration and wavelength correction for temperature fluctuations. In a further embodiment, laser 9 is located external to housing 3 or within a separate housing.

An optical mixing module 13 is coupled to input port 5 and laser 9, and mixes input signal 7 with reference signal 11 to produce a mixed output signal. A receiver module 15, having four photodiodes 17, 19, 21 and 23, is configured to receive the mixed output signal and extract signal information indicative of the optical power of input signal 7 at the reference wavelength $\lambda_r$. In this manner, by setting the reference wavelength $\lambda_r$ to the wavelength of an optical channel, characteristics of that optical channel can be monitored. By scanning the reference wavelength $\lambda_r$ across a range of wavelengths, the characteristics of a number of optical channels can be monitored in a time division manner.

Figure 5:
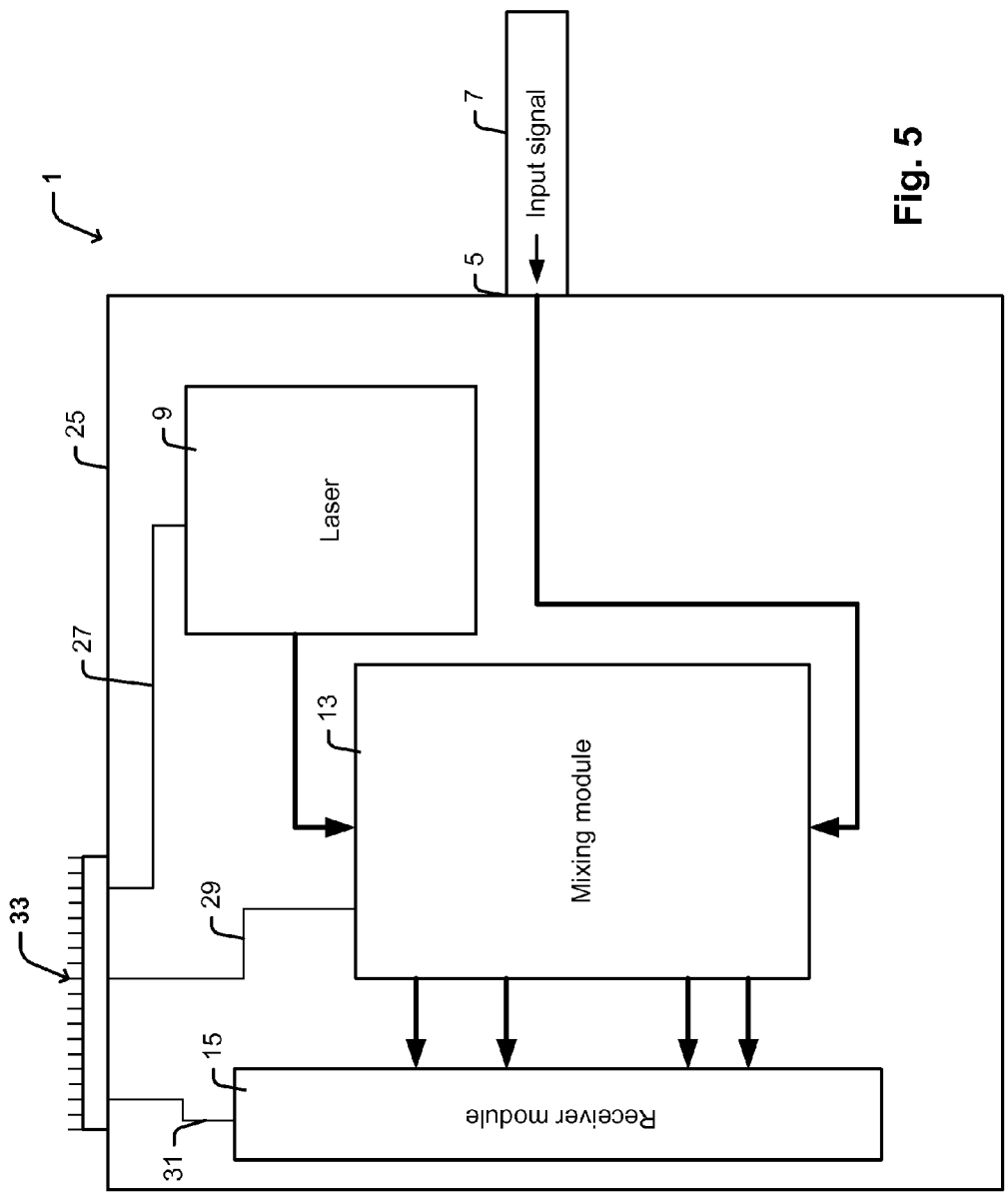
FIG. 5 is a schematic plan view of the optical channel monitor of FIGS. 1 to 4 illustrating an exemplary layout on the substrate.

Laser 9, mixing module 13 and receiver module 15 are all mounted to a substrate 25 within housing 3. As shown in the plan layout of FIG. 5, substrate 25 includes electrical interconnections, for example 27, 29 and 31, for electrically controlling various aspects of the monitor, including laser gain, laser center frequency, thermo-electric coolers, photodiode controls and data output to an external processor (not shown). It will be appreciated that the layout illustrated in FIG. 5 is only an exemplary layout of elements on substrate 25. It will be appreciated by persons skilled in the art that OCM 1 can be implemented in various layouts without departing from the scope of this disclosure.

Figure 6:
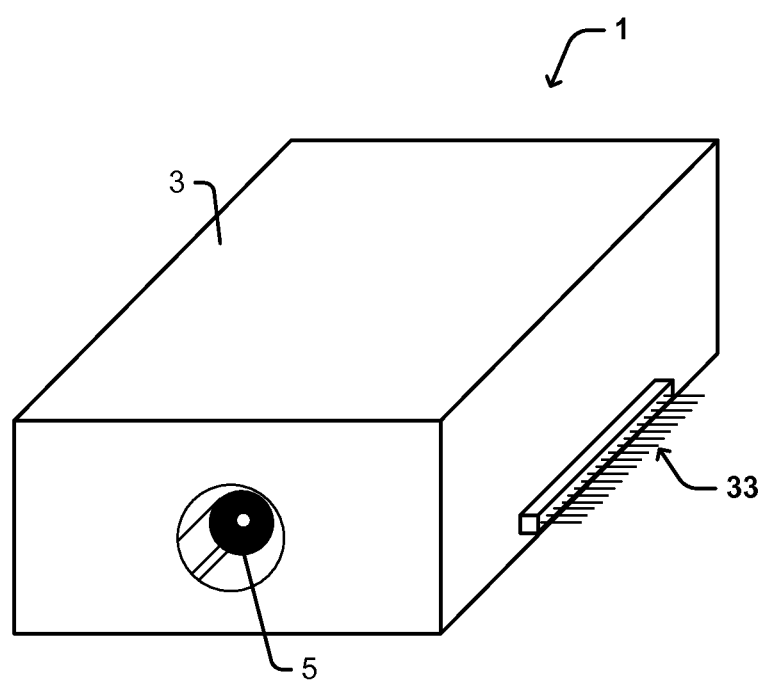
FIG. 6 is a perspective view of the optical channel monitor of FIGS. 1 to 5 as packaged with the housing in place.

Referring to FIG. 6, there is illustrated a perspective view of OCM 1 with housing 3 in place. In addition to input port 5, housing 3 also includes a plurality of electrical pins 33 that are connected to the electrical interconnections in substrate 25. Electrical pins 33 allow connection of OCM 1 to an external control system (not shown) for controlling OCM 1 and extracting data obtained by OCM 1.

Returning to FIGS. 1 to 4, the path of input signal 7 and reference signal 11 will be described. Reference signal 11 is coupled from laser 9 to mixing module 13 through a collimating lens 35. Similarly, input signal 7 is coupled from input port 5 to mixing module 13 through a single collimating lens 37. This fiber-free, essentially free-space propagation reduces optical loss and other effects such as PDL. It will be appreciated that, in other embodiments, additional lenses or other coupling optics are provided to couple input signal 7 and reference signal 11 to mixing module 13.

In OCM 1, input port 5 and laser 9 are oppositely disposed to allow input signal 7 and reference signal 11 to be input to OCM 1 in opposite directions. Further, input signal 7 and reference signal 11 are input substantially perpendicularly to the direction of output of a mixed output signal. This configuration allows a simple, compact design that is portable and convenient for tapping into optical networks at various network points.

The operation of mixing module 13 will now be described with reference to FIGS. 1 to 4. As will be described, the overall operation of mixing module 13 is to divide the input and reference signals into respective first and second orthogonal polarization components and to mix these orthogonal components together. In particular, mixing module 13 mixes a first orthogonal signal polarization component with a second orthogonal reference polarization component and mixes a second orthogonal signal polarization component with a first orthogonal reference polarization component.

A recent development in coherent detection is described in US Patent Application Publication 2011/0019994 entitled "High bandwidth demodulator system and method" to Frisken and assigned to Finisar Corporation (hereinafter "Frisken") discloses demodulator capable of decoding the complex electric field vector of an optical signal to derive phase and polarization information encoded in that signal. The inventors of the present invention have identified that the principles described in Frisken are applicable to channel monitoring techniques. However, coherent receivers generally cost in the order of tens of thousands of dollars while OCMs are typically much cheaper. The present OCM and mixing module 13 has been designed with cost and compactness in mind, and extends coherent receiving principles to an OCM but adapted to not rely on coherent detection.

While coherent receivers require bandwidths of greater than the data rate being detected, OCMs measure average optical power and do not require such high bandwidths. Accordingly, mixing module 13 is adapted to process signals at significantly lower bandwidths to that of a typical coherent receiver so as to reduce the overall cost and size of the OCM. As shown in FIG. 1, optical mixing module 13 includes a first polarization beam splitter 39 for spatially separating input signal 7 into first and second orthogonal signal polarization components 41 and 43. Beam splitter 39 is substantially rectangular in cross section and includes two wedge-shaped elements 45 and 47 of glass material, which define a central angled interface 49. Interface 49 includes a dielectric coating which allows one polarization component to pass while reflecting the orthogonal component.

In an alternative embodiment, elements 45 and 47 are shaped so that interface 49 is angled at Brewster's angle, given by $\theta_B = \tan^{-1}(n2/n1)$, where n1 is the refractive index of element 45 and n2 is the refractive index of element 47. At Brewster's angle, the polarization component having an electric field in the plane of the surface normal (component 43 in FIG. 1) will pass through interface 49 while the polarization component having an electric field perpendicular to the surface normal (component 41 in FIG. 1) will be entirely reflected.

Input signal 7 propagates through first wedge-shaped element 45 and is incident onto interface 49 where first polarization component 41 (shown as a vertical component in FIG. 1) is reflected and second orthogonal polarization component 43 (shown as a component into/out of the page in FIG. 1) is transmitted.

The reflected polarization component 41 is passed through a first polarization manipulation or transformation element, in the form of a quarter-wave plate 51 and mirror 53. First signal polarization component 41 passes through quarter-wave plate 51, is reflected off mirror 53 and passes again through quarter-wave plate 51. After the second pass of quarter-wave plate 51, component 41 is rotated by 90° into the orthogonal orientation (vertical in FIG. 1).

Component 41 is then passed back through beam splitter 39 where it passes directly through interface 49 due to its now orthogonal polarization orientation. After passing through beam splitter 39, component 41 is passed through a second polarization manipulation element in the form of a second quarter-wave plate 55. Quarter-wave plate 55 manipulates component 41 into a circular polarization state (illustrated as a 45° component) before component 41 reaches a polarization separation element in the form of a walk-off crystal 57. The same can be achieved if wave plate 55 is replaced by a half-wave plate at 22.5° angle. In that case component 41 will be linearly polarized at 45° instead of circular.

Walk-off crystal 57 spatially separates component 41 into two constituent orthogonal polarization sub-components 59 and 61. The thickness of crystal 57 is chosen so that sub-components 59 and 61 are separated by a predetermined distance and, at the output of crystal 57, the sub-components are each incident onto two respective adjacent photodiodes 17 and 19.

Referring still to FIG. 1, the path of polarization component 43 will now be described.

After transmission through interface 49 of beam splitter 39, component 43 traverses second wedge-shaped element 47 unimpeded and unmodified and is passed through a half-wave plate 63. Wave plate 63 manipulates component 43 to return an orthogonal polarization orientation (into/out of the page in FIG. 1). Component 43 then passes to a second polarization beam splitter 65, which includes two wedge-shaped elements 67 and 69 having different refractive indices. Beam splitter 65 is equivalent in operation to beam splitter 39 described above but is oppositely oriented. In some embodiments, beam splitters 39 and 65 and half-wave plate 63 are connected to form an integral component.

Component 43 passes through wedge-shaped element 67 and is reflected off an interface 71 at the connection between elements 67 and 69. Component 43 is directed upward through element 67 and traverses through quarter-wave plate 55 where it is manipulated into a circular polarization. Component 43 then traverses walk-off crystal 57 where it is spatially separated into two orthogonal polarization sub-components 73 and 75 having the same respective polarization orientations as sub-components 59 and 61. Components 73 and 75 emerge from crystal 57 and are received by respective photodiodes 21 and 23 in receiver module 15.

Figure 2:
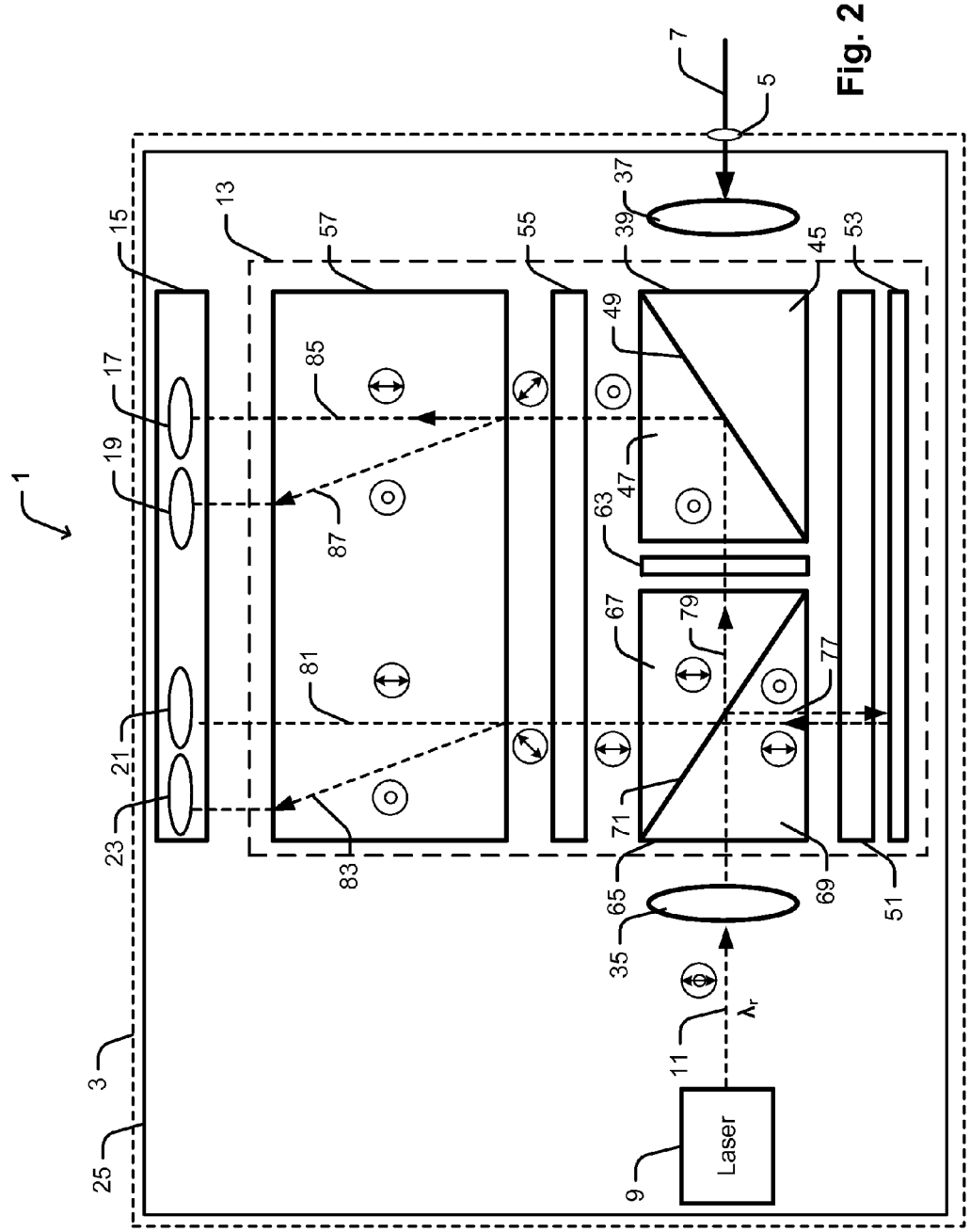
FIG. 2 is a schematic plan view of the optical channel monitor of FIG. 1 illustrating exemplary beam trajectories from the laser.

Referring now to FIG. 2, the path of reference signal 11 is illustrated. Reference signal 11 propagates through OCM 1 simultaneously with input signal 7. OCM 1 processes reference signal 11 in a similar manner to that described above in relation to input signal 7. Following collimation from lens 35, reference signal 11 is passed through beam splitter 65 where a first reference polarization component 77 is reflected and passed through quarter-wave plate 51 initially and again after reflection off mirror 53. An orthogonal second reference polarization component 79 passes through beam splitter 65.

On the return path from mirror 53, component 77 passes again through beam splitter 65 and is manipulated into circular polarization by quarter-wave plate 55. In an alternative embodiment, quarter-wave plate 55 is replaced with a half-wave plate having a fast axis that is angled at about 22.5° with respect to the beam direction. The quarter-wave plate or equivalent angled half-wave plate acts to reflect the axis of polarization resulting in a polarization change from linear to circular or vice versa. After beam splitter 65, the path of component 77 is substantially aligned with that of signal component 43 and, in passing through crystal 57, component 77 is spatially separated into two orthogonal polarization sub-components 81 and 83 having the same orientation as sub-components 73 and 75 illustrated in FIG. 1. Sub-components 81 and 83 follow substantially the same path through crystal 57 as sub-components 73 and 75, and are received by respective photodiodes 21 and 23.

After propagating through beam splitter 65, component 79 passes through half-wave plate 63 and is manipulated by an effective rotation of 90°. Component 79 is then reflected off interface 49 of beam splitter 39 and travels in alignment with input signal component 41. Component 79 traverses quarter-wave (or half-wave) plate 55, is manipulated into circular (or linear 45°) polarization and is then separated into orthogonal polarization sub-components 85 and 87 by crystal 57. Sub-components 85 and 87 follow substantially the same path through crystal 57 as sub-components 59 and 61, and are received by respective photodiodes 17 and 19.

In the above manner, mixing module 13 mixes first signal polarization component 41 with second reference polarization component 79 and mixes second signal polarization component 43 with first reference polarization component 77. The respective signal and reference components mixed together are orthogonal in polarization. The mixed polarization sub-components 59, 85, 61, 87, 73, 81, 75 and 83 represent the mixed output signal. This heterodyne type operation acts as a spectral filter in that only wavelength components of input signal 7 at or very close to the frequency of reference signal 11 will be passed through the analog signal chain and remain. All other signal components will fall outside the electronic bandwidth of the receiver and be rejected. The result is a sharp filter passband centered around the reference wavelength $\lambda_r$ at the receiver module 15.

Figure 3:
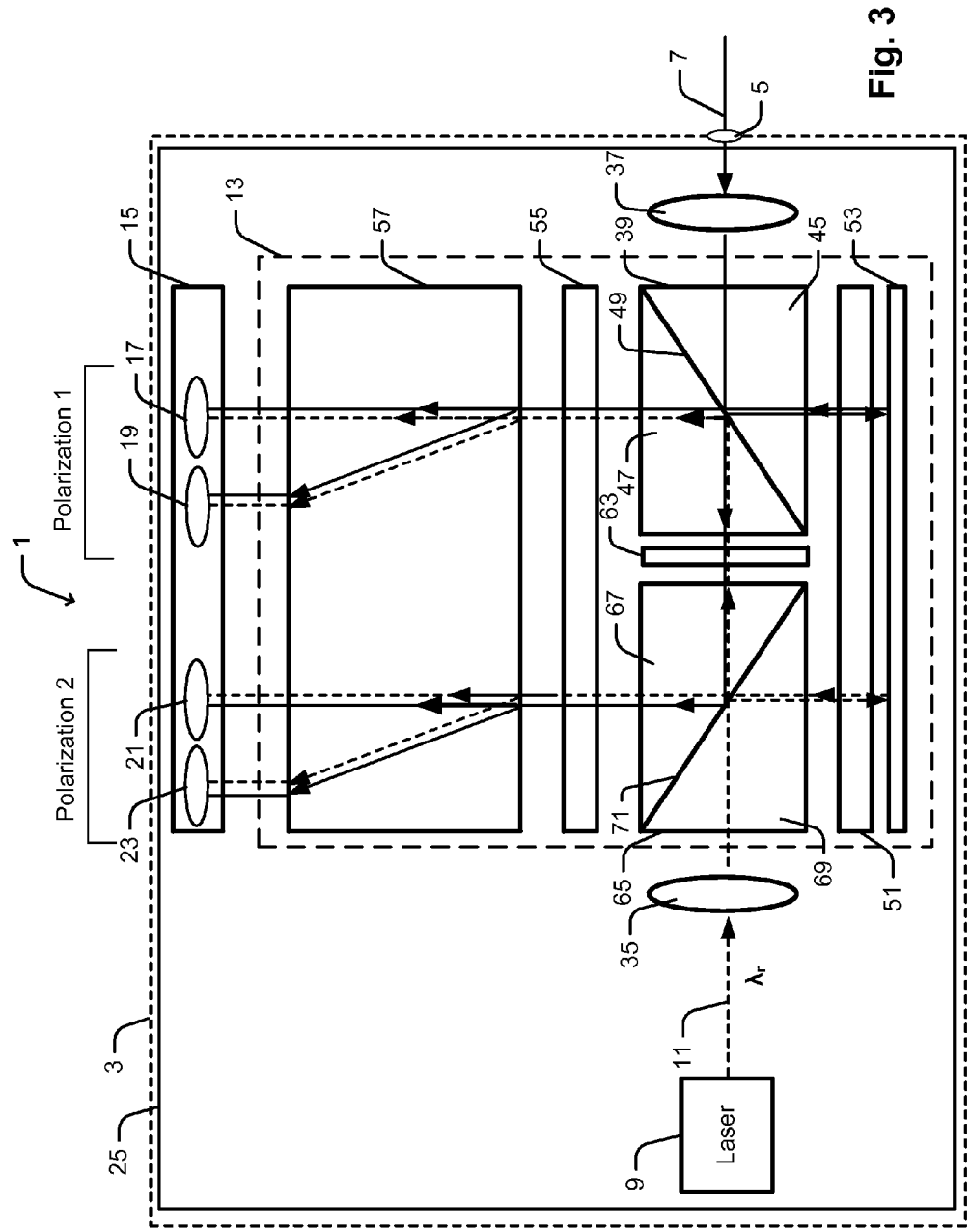
FIG. 3 is a schematic plan view of the optical channel monitor of FIGS. 1 and 2 illustrating exemplary beam trajectories from both an input signal and the laser.
Figure 4:
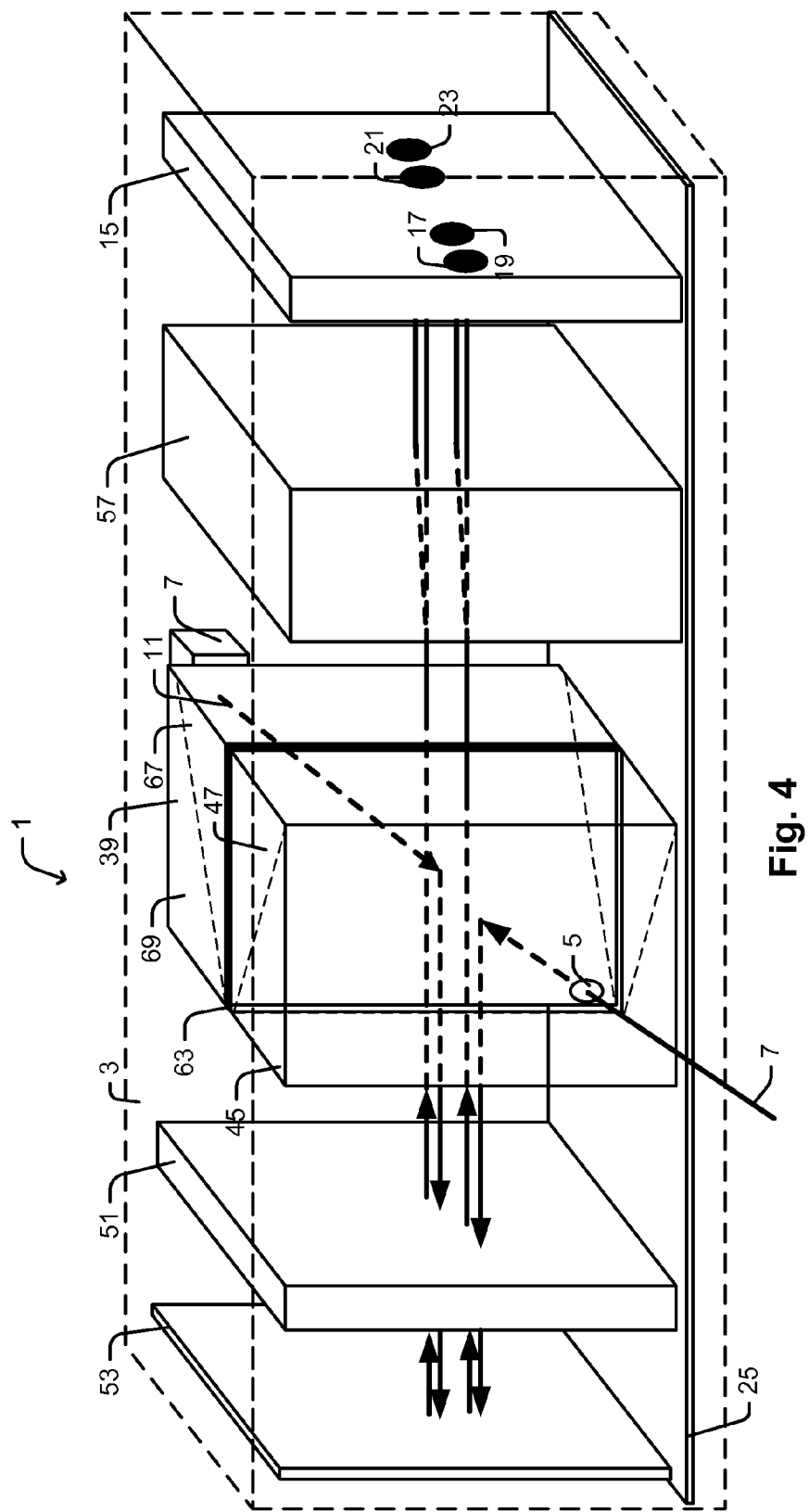
FIG. 4 is a side perspective view of the optical channel monitor of FIGS. 1 to 3 illustrating exemplary beam trajectories from both an input signal and the laser.

As illustrated in FIG. 3, OCM 1 separates orthogonal polarization components of input signal 7 for individual analysis. This allows the measurement of polarization information of input signal 7 and measurement of the polarizing nature of the local optical network. From the signal polarization information, network performance such as PMD and PDL can be measured through comparison with OCM measurements at other network points. Calibration of the orthogonal polarization measurements allows for an accurate polarization independent power measurement in the presence of fluctuating polarization states over time. For single polarization signals, the wavelength dependence of the polarization state can be estimated from the orthogonal polarization measurements and this corresponds to the polarization mode delay of the system. For a polarization multiplexed system, the PDL of the system is estimated by analyzing the statistics of the incident power measured at each channel for the orthogonal polarization states.

Figure 7:
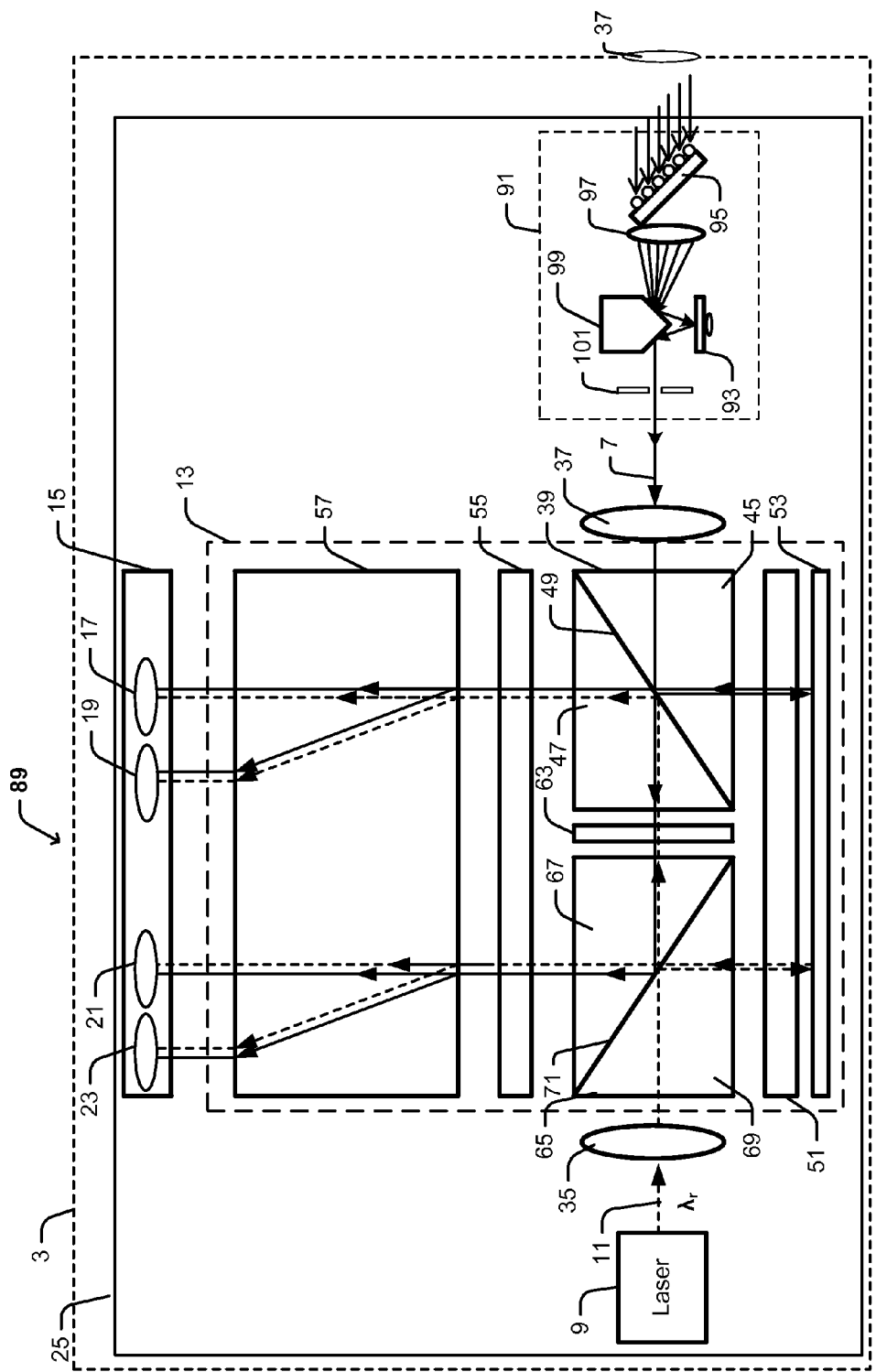
FIG. 7 is a schematic plan view of an optical channel monitor according to a second embodiment.

Referring now to FIG. 7, there is illustrated an OCM 89 according to a second embodiment. Corresponding features of OCM 1 in OCM 89 are designated with the same reference numerals.

OCM 89 includes a signal selecting module 91 for selecting a single input optical signal 7 from a plurality of optical signals input through port 5. In the illustrated embodiment, six signals are input to OCM 89 through port 5. However, it will be appreciated that, in other embodiments, OCM 89 is adapted to receive and monitor greater or fewer input signals.

Signal selecting module 91 includes a micro-electromechanical mirror (MEMS) 93 that is mounted to substrate 25 and is tiltable at a number of predefined angles in response to an electric control signal. Signal selecting module 91 also includes an array of micro lenses 95 and a focusing lens 97 for angularly focusing the plurality of beams onto MEMS 93 at different angles based on their input position. To project the signals onto MEMS 93, an angled reflector 99 is situated above MEMS 93. Reflector 99 includes a first angled surface for directing the signals downward onto MEMS 93 and a second angled surface for directing the signals through lens 37. Although MEMS 93 is illustrated as being tiltable about an axis perpendicular to substrate 25, in preferred embodiments, MEMS 93 is disposed parallel with the plane of substrate 25. In these latter embodiments, reflector 99 is disposed above MEMS 93 and directs the signals vertically down onto MEMS 93.

The tilt angle of MEMS 93 defines the specific optical signal to be passed through a filtering slit 101 to OCM 89 and subsequently monitored. The remaining signals are not coupled through slit 101 and are attenuated.

By periodically tilting MEMS 93 and scanning the reference frequency $\lambda_r$, a number of wavelength channels from a number of different optical signals can be periodically monitored.

Another function of the high resolution optical channel monitors described herein is the ability to continuously or periodically monitor a single frequency of an optical signal over a period of time. This is referred to as a 'staring mode' of operation and is useful for obtaining information relating to the optical signal-to-noise ratio (OSNR) and node origin of wavelength channels. Exemplary staring mode OCM operation is described in U.S. patent application Ser. No. 14/306,502 to Frisken filed on 17 Jun. 2014 and entitled "Optical Channel Monitor with High Resolution Capability". The contents of this document are incorporated herein by way of cross-reference.

In another embodiment, the optical mixing module 13 is expanded to provide phase information of the input signal by also mixing the input signal with a delayed version of itself. In this embodiment, mixing module 13 includes additional components such as a further beam splitter, optical delay element and additional photodiodes.

In another embodiment, an OCM as described above is adapted to provide the monitoring in a feedback system for an optical network. Such a feedback system is illustrated schematically in FIG. 8. An exemplary optical network 103 includes a plurality of Nodes 105, 107, 109 and 111 wherein optical channels are added and dropped. The nodes are interconnected by lengths of transmission optical fibers (e.g. 113). Within each of the nodes are optical compensators, which include various elements for rectifying, compensating and modifying the optical signals such as dispersion compensators and amplifiers. OCMs 117, 119, 121 and 123 as described above are tapped into the network at certain points and monitor optical channels in the optical network at those respective points. The channel information measured by the OCMs includes channel powers, channel frequencies, polarization information, dispersion and the like. OCMs 117, 119, 121 and 123 are connected, through electrical pins 33, to a system controller 125, which provides feedback control signals 127, 129, 131 and 133 to the respective compensators within the nodes across network 103 so as to adapt the system accordingly. By way of example, if OCM 123 measures channel power to be below a certain threshold level, controller 125 sends control signal 133 to an optical amplifier within node 111 to increase the gain and hence increase the channel power. Additional OCMs are able to be inserted at other points in the network to provide further feedback.

Figure 8:
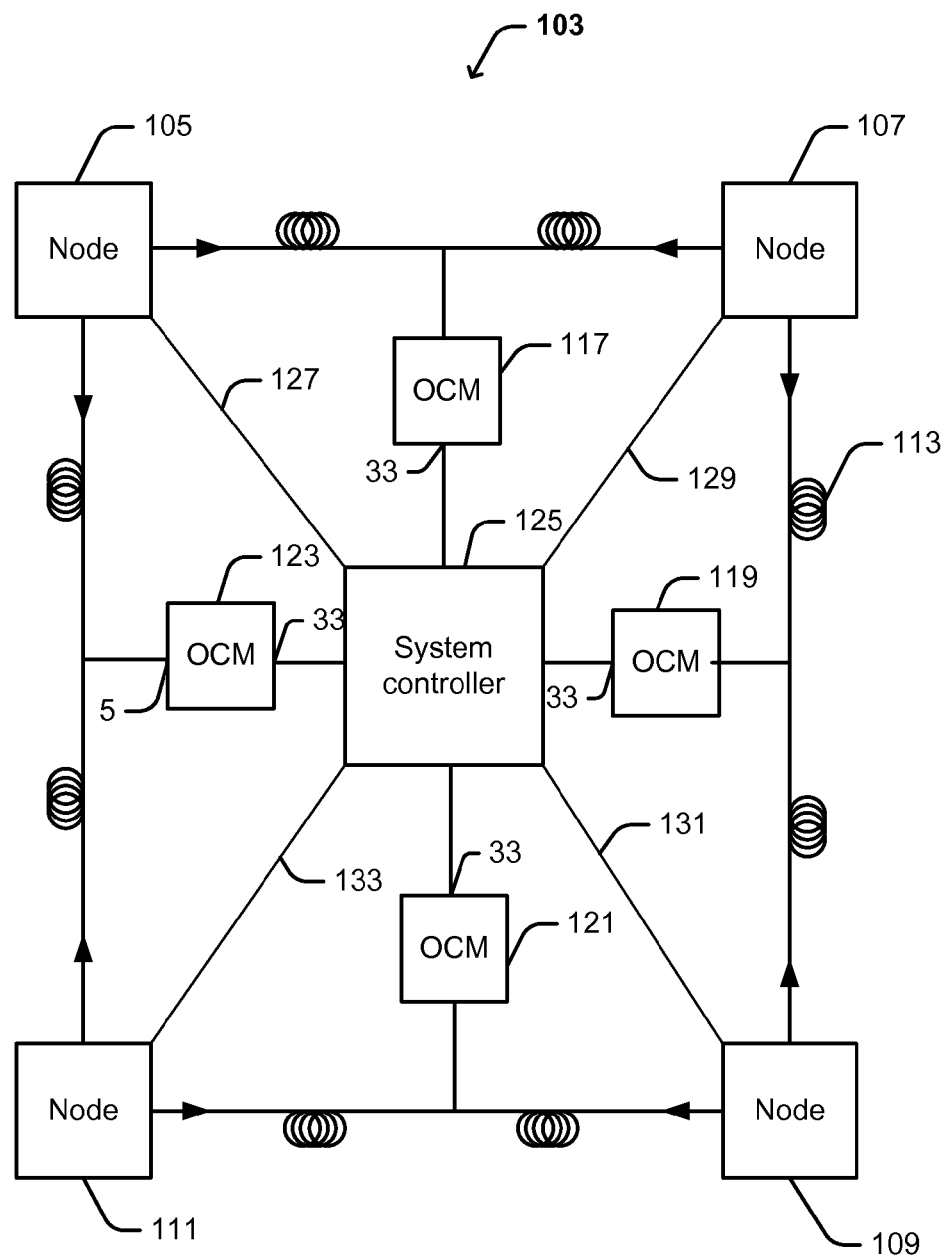
FIG. 8 is a functional diagram of an exemplary optical network incorporating optical channel monitors.

In one exemplary application utilizing the feedback architecture of FIG. 8, the accurate high resolution monitoring of the channels allows for the control and compensation of the intrachannel transfer functions as described in US Patent Application Publication 20120328291 to Frisken et al. entitled "Optical Wavelength Selective Switch Calibration System" and assigned to Finisar Corporation. The contents of US 20120328291 are incorporated herein by way of cross reference.

The high resolution channel monitoring provides the input for the system controller to derive a calibration algorithm (applied within an adjacent node) to modify the channel transfer function at a specific point in the network. Optical channel monitoring can be performed at each node in the network and the respective nodes configured to receive calibration algorithm controls from a system controller to calibrate the respective channel transfer functions.

The high frequency accuracy and high rejection of adjacent channels allows the OCM to accurately measure the spectrum of each signal or channel at each node and feed this back to the system controller for calibration. By comparing measurements of each channel signal at multiple points along the signal path (e.g. at each node), the system controller can optimize channel performance by modifying (optimizing) either the source laser wavelength and/or the center wavelength of any optical switching or filtering element (such as a wavelength selective switch or programmable multiplexer/demultiplexer) in a node. This allows the relaxing of guard bands that are set to allow for aging and temperature drift of components (including wavelength selective switches and transmitters). The above described OCM feedback also provides enhanced spectral efficiency of the optical system and reduces the cost of components by relaxing tolerances and removing unnecessary frequency-blocking elements such as etalons in lasers.

CONCLUSIONS

It will be appreciated that the various embodiments described above provide a compact high resolution optical channel monitor.

By implementing mixing of an input signal with a reference signal into a channel monitor, it is envisaged that efficient channel monitoring can be performed with channel-to-channel isolation of greater than 20 dB achievable over a total power dynamic range of 20 dB.

The designs of the OCMs described above provide a compact, cost effective solution for implementing a OCM co-packaged with a non-fiber coupled tunable laser.

Various advantages associated by the embodiments described herein include:

Very high intrinsic optical resolution to improve spectral analysis performance.

Reduced guard-bands at each channel edge.

An ability to identify sub-channels in super-channels sent in an optical orthogonal frequency division modulation scheme.

"Staring" ability—the ability to sit at a fixed frequency and monitor output signals. This is useful for optical signal-to-noise measurements in coherent and super-channel systems.

High-reliability due primarily to little or no moving parts. The wavelength to be monitored is selected by electronic tuning of the reference wavelength in a semiconductor laser.

Fast tuning and reconfiguration flexibility provided by the tunable semiconductor laser.

Small compact size suitable for deployment at various locations in an optical network.

The mixing module is accessed from opposing directions to simplify integration into a conventional butterfly-type device package.

No fiber coupling of the laser is required.

Interpretation

Throughout this specification, use of the term "element" is intended to mean either a single unitary component or a collection of components that combine to perform a specific function or purpose.

Throughout this specification, use of the term "orthogonal" is used to refer to a 90° difference in orientation when expressed in a Jones vector format or in a Cartesian coordinate system. Similarly, reference to a 90° rotation is interpreted to mean a rotation into an orthogonal state.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while there has been described what are believed to be the preferred embodiments of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

We claim:

1. An optical channel monitor including:
   a protective housing;
   an input port disposed in the housing and configured for receiving at least one input optical signal including one or more optical channels separated by wavelength;
   a wavelength configurable laser located within the housing and configured to provide an optical reference signal at a plurality of wavelengths, the laser being adapted to scan across the plurality of wavelengths covering the one or more optical channels;
   an optical mixing module located within the housing and coupled to the input port and the laser for mixing the at least one input optical signal with the optical reference signal to produce a mixed output signal; and
   a receiver module located within the housing and configured to receive the mixed output signal and extract signal information indicative of at least the optical power of the at least one input optical signal at each of the plurality of wavelengths.

2. An optical channel monitor according to claim 1 wherein the optical reference signal is coupled from the laser to the mixing module through free space and one or more lenses.

3. An optical channel monitor according to claim 1 wherein the extracted signal information is also indicative of the polarization of the at least one input optical signal at the plurality of wavelengths.

4. An optical channel monitor according to claim 1 including a signal selecting module for selecting an input optical signal from a plurality of optical signals.

5. An optical channel monitor according to claim 4 wherein the signal selecting module includes a microelectromechanical mirror (MEMS) tiltable at a number of predefined angles, wherein the tilt angle sets the particular optical signal to be passed to the optical mixing module.

6. An optical channel monitor according to claim 4 wherein the signal selecting module includes a lens for angularly focusing the plurality of beams onto the MEMS.

7. An optical channel monitor according to claim 1 wherein the input optical signal and reference signal are input substantially perpendicularly to the direction of output of the mixed output signal.

8. An optical channel monitor according to claim 1 wherein the wavelength configurable laser is a tunable semiconductor laser.

9. An optical channel monitor according to claim 1 wherein the receiver module includes an array of photo diodes.

10. An optical channel monitor according to claim 1 wherein the optical mixing module is configured to mix a first signal polarization component with a second orthogonal reference polarization component and to mix a second signal polarization component with a first orthogonal reference polarization component.

11. An optical channel monitor according to claim 10 wherein the optical mixing module includes a first polarization beam splitter for spatially separating the input signal into the first and second orthogonal signal polarization components.

12. An optical channel monitor according to claim 11 wherein the optical mixing module includes a second polarization beam splitter for spatially separating the reference signal into the first and second orthogonal reference polarization components.

13. An optical channel monitor according to claim 12 wherein the first and second polarization beam splitters are a single unitary element.

14. An optical channel monitor according to claim 12 wherein the optical mixing module includes a first polarization manipulation element for rotating both the first signal polarization component and the first reference polarization component by 90 degrees.

15. An optical channel monitor according to claim 14 wherein the first polarization manipulation element includes a quarter-wave plate and a mirror.

16. An optical channel monitor according to claim 14 wherein the optical mixing module includes a second polarization manipulation element for manipulating each of the first and second signal polarization components and the first and second reference polarization components into a circular polarization or 45° linear polarization.

17. An optical channel monitor according to claim 16 wherein the optical mixing module includes a polarization separating element for spatially separating each of the first and second signal polarization components into signal sub-components having orthogonal polarizations and spatially separating the first and second reference polarization components into reference sub-components having orthogonal polarizations.

18. A optical channel monitor including:
 a tunable laser to provide a first local oscillator input, the tunable laser being adapted to scan across a plurality of wavelengths to tune the first local oscillator input;
 an optical channel signal including at least one optical channel;
 first and second beam splitters, each of the beam splitters splitting the input optical signal into substantially orthogonal first and second polarization components, and outputting the first and second polarization components at predetermined positions; and
 a series of polarization transformation elements arranged around the beam splitters for transforming the polarization of the first and second polarization components to predetermined transformed first and second polarization components;
 wherein, a first polarization component of the first local oscillator input is mixed with an orthogonal second polarization component of the optical channel signal to form a first mixer output; and a second orthogonal polarization component of the first local oscillator source is mixed with the first orthogonal polarization component of the optical channel signal to form a second mixer output.

19. A optical channel monitor according to claim 18 further including:
 a polarization separation element, separating said first mixer output into orthogonal polarization components and said second mixer output into orthogonal polarization components for analysis.

20. A control system for an optical network having a plurality of interconnected nodes and at least one compensating module disposed between the nodes, the optical network adapted to transmit optical signals including one or more wavelength channels between the nodes, the control system including:
 an optical channel monitor according to claim 1 and configured to monitor one or more characteristics of the optical channels and send a monitor signal to a system controller; and
 a system controller in communication with both the optical channel monitor and the at least one compensating module, the controller adapted to, in response to the monitor signal, send a control signal to the at least one compensating module so as to apply compensation to the monitored optical channels.

* * * * *